United States Patent [19]

Murota

[11] Patent Number: 4,850,832
[45] Date of Patent: Jul. 25, 1989

[54] OIL PUMP FOR AUTOMATIC TRANSMISSION WITH EFFECTIVE SEALING ARRANGEMENT

[75] Inventor: Kazuya Murota, Ebina, Japan

[73] Assignee: Nissan Motor Co., Ltd., Yokohama, Japan

[21] Appl. No.: 176,007

[22] Filed: Mar. 31, 1988

[30] Foreign Application Priority Data

Mar. 31, 1987 [JP] Japan ................................. 62-79333

[51] Int. Cl.$^4$ .......................... F04B 21/00; F04C 15/00
[52] U.S. Cl. .................... 418/170; 74/606 R; 184/612; 184/31
[58] Field of Search ............... 418/169, 170, 171, 166; 184/6.12, 31; 74/606 R; 417/434

[56] References Cited

U.S. PATENT DOCUMENTS

| | | | |
|---|---|---|---|
| 3,053,115 | 9/1962 | Cartwright et al. | 74/606 R |
| 4,098,143 | 7/1978 | Kubo et al. | 74/606 R |
| 4,203,331 | 5/1980 | Shindo et al. | 74/606 R |
| 4,255,093 | 3/1981 | Erikson | 418/170 X |

FOREIGN PATENT DOCUMENTS 54-160946 12/1979 Japan .

OTHER PUBLICATIONS

Service Manual of Automatic Transmission of the RN4F02A Type, RL4F02A Type, pp. 51 to 73; (issued by Nissan Motor Company, Ltd.,); 1984.

*Primary Examiner*—Leonard E. Smith
*Attorney, Agent, or Firm*—Foley & Lardner, Schwartz, Jeffery, Schwaab, Mack, Blumenthal & Evans

[57] ABSTRACT

A pump housing is formed with a recess receiving therein pump elements, and a pump cover is secured to the pump housing to close the recess. The pump cover and the pump housing define an interface area therebetween formed with a pump discharge port. The pump casing is provided with a predetermined passage which normally serves as an oil pressure delivering passage, but serving as a drain passage under a condition when the oil pump discharge pressure increases. The predetermined passage is open within said interface area via a groove extending around the pump discharge port.

4 Claims, 4 Drawing Sheets

| RANGE | FRICTION ELEMENT / SPEED | L/C | H/C | R/C | B/B | LR/B | LO/C |
|---|---|---|---|---|---|---|---|
| D | 1 SPEED | O | × | × | × | × | O |
| | 2 SPEED | O | × | × | O | × | × |
| | 3 SPEED | O | O | × | × | × | × |
| | 4 SPEED | × | O | × | O | × | × |
| III | 1 SPEED | O | × | × | × | × | O |
| | 2 SPEED | O | × | × | O | × | × |
| | 3 SPEED | O | O | × | × | × | × |
| II | 1 SPEED | O | × | × | × | × | O |
| | 2 SPEED | O | × | × | O | × | × |
| I | 1 SPEED | O | × | × | × | O | × |
| R | REV. | × | × | O | × | O | × |
| P, N | | × | × | × | × | × | × |

OIL PUMP FOR AUTOMATIC TRANSMISSION WITH EFFECTIVE SEALING ARRANGEMENT

RELATED APPLICATIONS

The following five U.S. patent applications have been concurrently filed with the present application and are to be commonly assigned herewith. They disclose subject matters which are related to the subject matter of the present application.

1. U.S. patent application Ser. No. 176,012, filed by Hiromi TAGUCHI, claiming priority on Japanese Utility Model Application No. 62-46997 with a filing date of Mar. 31, 1987;
2. U.S. patent application Ser. No. 176,011, filed by Kazuya MUROTA et al., claiming priority on Japanese Patent Application No. 62-79334 with a filing date of Mar. 31, 1987;
3. U.S. patent application Ser. No. 176,013, filed by Kazuya MUROTA, claiming priority on Japanese Patent Application No. 62-79335 with a filing date of Mar. 31, 1987;
4. U.S. patent application Ser. No. 176,017, filed by Hiromi TAGUCHI, claiming priority on Japanese Utility Model Application No. 62-46999 with a filing date of Mar. 31, 1987;
5. U.S. patent application Ser. No. 176,016, filed by Hiromi TAGUCHI, claiming priority on Japanese Patent Application No. 62-79331 with a filing date of Mar. 31, 1987;

BACKGROUND OF THE INVENTION

The present invention relates to an oil pump for an automatic transmission, and more particularly to an effective measure for removing residual pressure occurring in the interface defined between a pump housing and a pump cover.

In an automatic transmission, an oil pump is an indispensable element as a source of pressurized oil supplied to a control valve assembly for controlling gear shifting. Commonly, an oil pump comprises a pump housing formed with a circular recess receiving therein pump elements and a pump cover secured to the pump housing to close the recess. The interface defined between the pump housing and the pump cover is sealed. Under an operating condition when a discharge pressure is high, a portion of oil discharged out of a pump discharge port will enter the interface between a pump housing and a pump cover, causing a residual pressure to occur. This residual pressure tends to separate the pump housing from the pump casing to increase the clearance therebetween, causing a substantial amount of oil leakage which results in a considerable drop in discharge performance of an oil pump.

In the case of an oil pump employed by a known transaxle of the A240E type manufactured by Toyota Motor Company Limited, a plurality of drain grooves are open at the interface between a pump housing and a pump casing for removing oil having entered the interface. These drain grooves provided for this purpose only are formed in the interface, so that the interface has to have a relatively large area for allowing arrangement of the drain grooves in addition to passages and/or grooves which are needed for gear shifting and torque converter operations.

An object of the present invention is to remove residual pressure occurring between a pump housing and a pump cover without relying on the above-mentioned measure of forming additional drain grooves used only for the drainage purpose.

SUMMARY OF THE INVENTION

According to one aspect of the present invention, there is provided an oil pump for an automatic transmission, comprising:

a pump casing including a pump housing formed with a recess receiving therein punp elements, and a pump cover secured to said pump housing, said pump cover and said pump housing defining an interface area therebetween;

said pump casing being provided with means for defining a predetermined passage which normally serves as an oil pressure delivering passage, said predetermined passage serving as a drain passage under a condition when the oil pump discharge pressure increases, said predetermined passage being open within said interface area.

DETAILED DESCRIPTION OF THE INVETION

Figure 2:
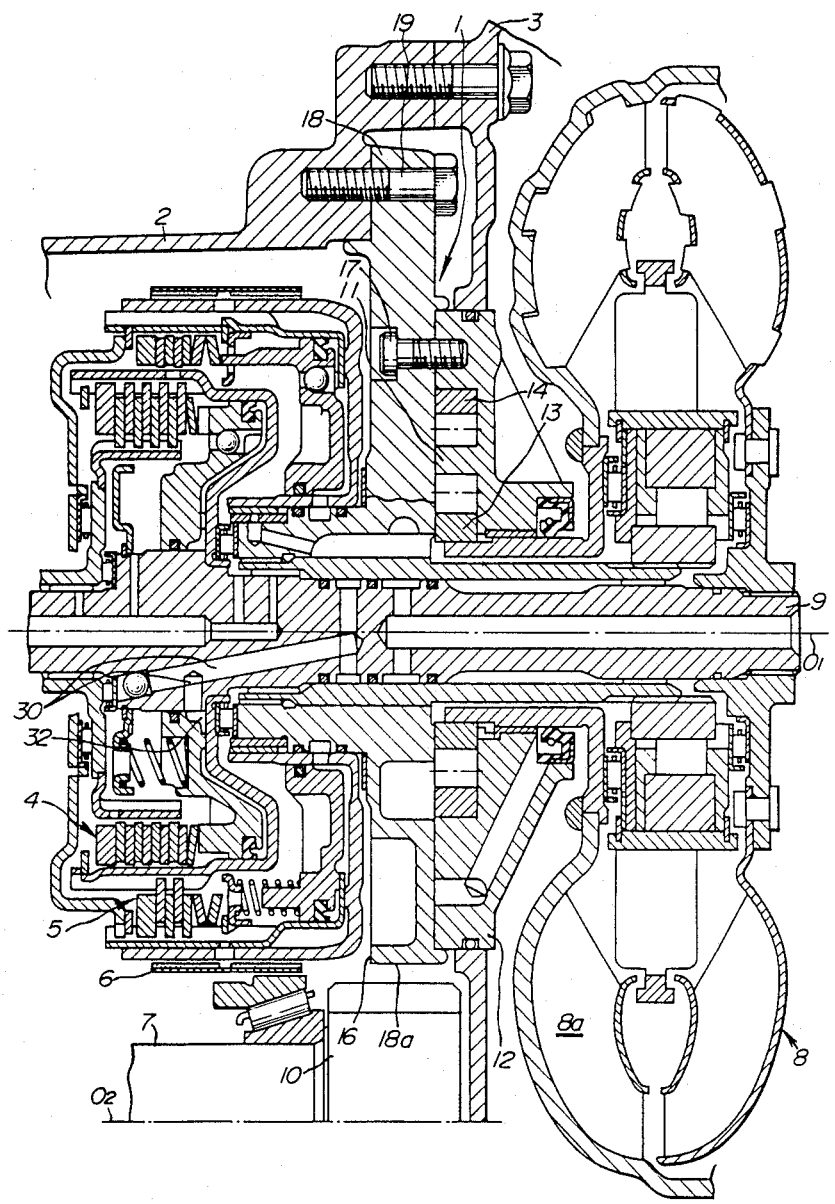
FIG. 2 is a fragmentary section taken through the line II—II of FIG. 1 showing the oil pump in its installation state in the automatic transaxle.

Referring to FIG. 2, an automatic transaxle comprises a transmission casing 2 and a converter housing 3 which are securely bolted to each other. Within the transmission case 2 is a transmission gearing arranged around a main axis $O_1$. The transmission gearing includes a high clutch 4, a reverse brake and a band brake 6. Arranged also within the transmission case 2 is a counter shaft 7. The counter shaft 7 is supported for rotation about an auxiliary axis $O_2$ extending in parallel to the main axis $O_1$ which an input shaft 9 is rotatable about.

Figure 1:
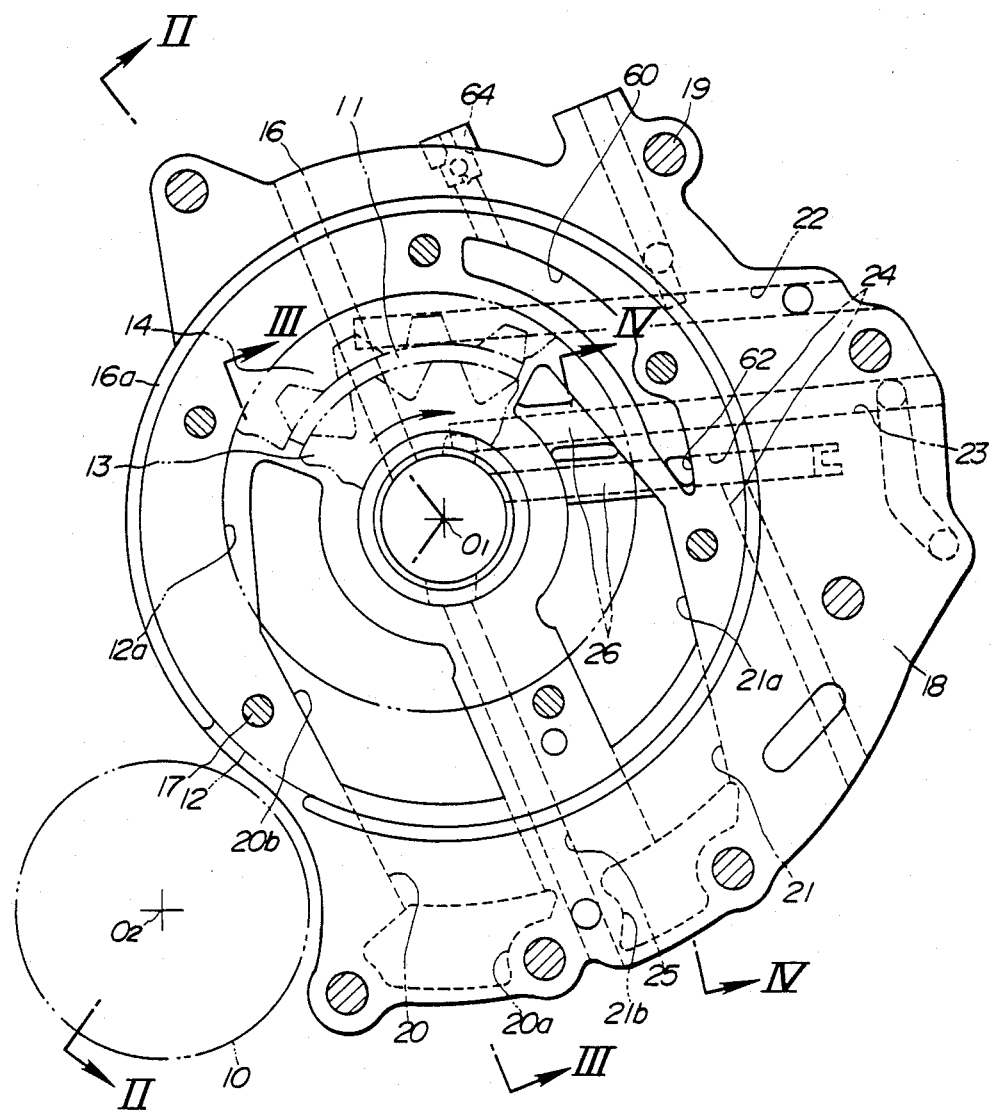
FIG. 1 is a plan view of an oil pump cover of an oil pump according to the present invention with an oil pump housing thereof shown in phantom and a final drive pinion of an automatic transaxle shown in phantom.

Referring also to FIG. 1, an oil pump generally designated by the reference numral 1 comprises an oil pump casing including an oil pump housing 12 formed with a circular recess defined by an annular wall 12a. Disposed in this circular recess is an outer gear 14 which is internally toothed to operatively engage with an inner gear 13. However, the inner gear 13 is separated from the outer gear 14 by a cresent wall 11 formed in the circular recess at an upper portion as viewed in FIG. 2. For rotation with an engine, the inner gear 13 is coupled with a sleeve section of a converter hub which is rivetted to an outer shell of a pump impeller 8a of the torque converter 8. Since the pump impeller 8a is rotatable with the engine output shaft and the inner gear 13 is rotatable with the sleeve section of the converter hub secured to the pump impeller 8a, the inner gear 13 is driven by the engine and rotates about the main axis $O_1$ in a direction as indicated by an arrow shown in FIG. 1. The circular recess formed in the oil pump housing 12 is closed by an oil pump cover 16 of the pump casing.

As best seen in FIG. 1, the oil pump cover 16 is formed with an annular rib 16a receiving therein the oil pump housing 12. With a plurality of bolts 17, the oil pump cover 16 is secured to the oil pump housing 12. The oil pump cover 16 includes an integral flange section 18 extending radially outward from the annular rib 16a. This integral flange section 18 is secured to the transmission casing 2 by a plurality of bolts 19 to define an interface via which an oil is supplied to the oil pump 1 and a pressurized oil discharged by the oil pump 1 is supplied to a fluid regulator of a control valve assembly of the automatic transmission.

As shown in FIG. 1, the oil pump cover 16 is formed with an inlet passage 20 extending from an inlet opening 20a to a pump inlet port 20b and also with an outlet passage 21 extending from a pump discharge port 21a to an outlet opening 21b. Extending through the oil pump cover 16 are a plurality of circuit passages including a torque converter oil discharge passage 22, a torque converter oil supply passage 23, a high clutch pressure passage 24 and a reverse clutch pressure passage 25.

Figure 3:
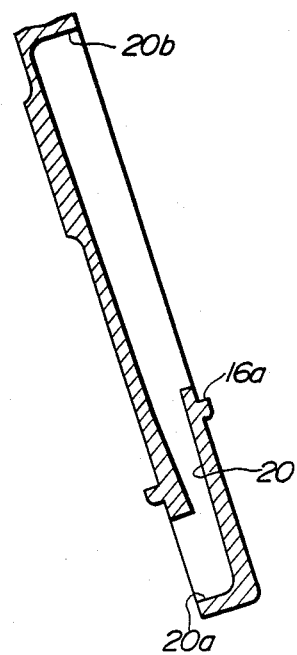
FIG. 3 is a section taken through the line III—III of FIG. 1 showing an inlet passage leading from an inlet opening to a pump inlet port.
Figure 4:
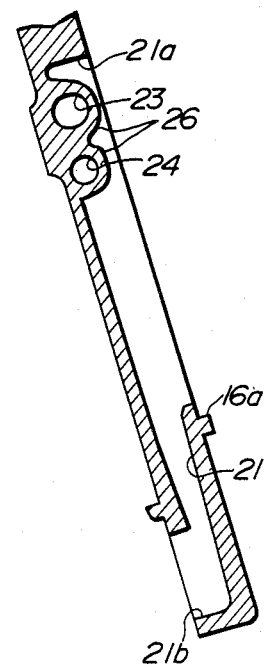
FIG. 4 is a section taken through the line IV—IV of FIG. 1 showing an outlet passage leading from a pump discharge port to an outlet opening.

As best seen in FIGS. 3 and 4, the inlet passage 20 and the outlet passage 21 extend radially inward of the annular rib 16a to connect inlet and outlet openings 21a and 21b disposed in the flange section 18 outside of the annular rib 16a with the pump inlet port 20b and the pump discharge port 21a disposed inside of the annular rib 16a. This passage structure has contributed to a reduction in diameter of the oil pump housing 12.

As best seen in FIG. 3, there is no passage extending across the pump inlet port 20b and the pump inlet port 20b has a substantially flat bottom wall, so that the effective flow area through the inlet passage 20 can be increased to its maximum. Thus, the formation of cavitation or noise caused thereby at high speed engine operation are prevented or at least minimized.

As best seen in FIG. 4, among all of the circuit passages 22, 23, 24 and 25, two passages 23 and 24 extend across the pump discharge port 21a through an elevated portion 26 from the bottom wall of the pump discharge port 21a. This elevated portion 26 adds to the structural rigidity of the portion where the pump discharge port 21a is disposed. Thus, oil leak from the pump discharge port 21a is prevented or at least reduced.

Figures 5, 6:
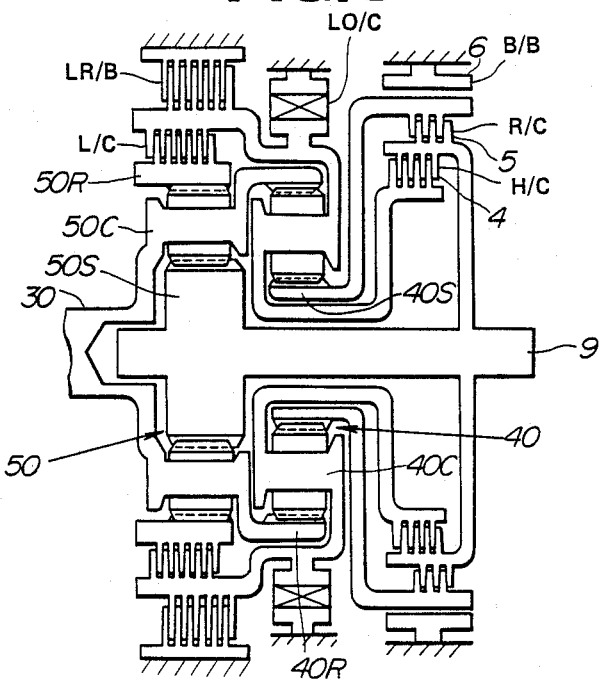
FIG. 5 is a schematic view of the transmission gearing.
FIG. 6 is a table showing a shifting schedule.

Referring now to FIGS. 5 and 6, the transmission employed by the transaxle is further described for the purpose of understanding the operation of the high clutch 4 which is labelled as H/C.

This transmission and its oil pressure control system are known and described in a publication entitled "SERVICE MANUAL OF AUTOMATIC TRANSMISSION OF THE RN4F02A TYPE, RL4F02A TYPE" (A261C06) issued by NISSAN MOTOR COMPANY LIMITED. A particular attention should be paid to description from page 51 to page 73 thereof.

As shown in FIG. 5, the high clutch 4, reverse clutch 5 and band brake 6 are labelled as H/C, R/C and B/B, respectively. This transmission comprises an output shaft 30 that is drivingly connected via an idle gear, not shown, and the counter shaft 7 to the final pinion 10 (see FIGS. 2 also). A front planetary gear set 40 and a rear planetary gear set 50 are arranged around the input shaft 9. The band brake B/B is arranged to anchor a front sun gear 40S of the front planetary gear set 40.

The reverse clutch R/C is arranged to connect the front sun gear 40S to the input shaft 9. The high clutch H/C is arranged to connect a front carrier 40C of the front planetary gear set 40 to the input shaft 9. A low one-way clutch LO/C is arranged to prevent reverse rotation of the front carrier 40C. This front carrier 40C is adapted to be anchored by a low & reverse brake LR/B. A front ring gear 40R of the front planetary gear set 40 is connected to a rear carrier 50C of the rear planetary gear set 50, which carrier 50C is in turn connected to the output shaft 30. A rear ring gear 50R of the rear planetary gear set 50 is connectable via a low clutch L/C to the front carrier 40C. A rear sun gear 50S of the rear planetary gear set 50 is connected to the input shaft 9.

This transmission provides four forward speeds during D range, and one reverse speed by activating selected combination of friction elements in the pattern as shown in FIG. 6. In FIG. 6, the friction elements which are activated are denoted by the reference character o, while the friction elements which are not activated are denoted by x. A range labelled III designates a state in D range where establishment of an overdrive (OD) or 4th speed is prohibited.

As will now be understood, during operation with the 3rd or 4th speed, the high clutch 5 shown in FIG. 2 is activated by a high clutch pressure supplied to a clutch servo chamber 32 via a passage 30 formed through the input shaft 9. This high clutch pressure is supplied to the above mentioned passage 30 via the high clutch passage 24 formed through the pump cover 16 as shown in FIG. 1. More specifically, the high clutch pressure which originates at a 2-3 shift valve of a control valve assembly is delivered the outer periphery of the pump cover 16 to the inner periphery thereof via the high clutch passage 24, then to the passage 30, and then to the clutch servo chamber 32. During operation with the 1st or 2nd or reverse speed, the oil is discharged from the clutch servo chamber 32 to release the high clutch 4 via the passages 30 and 24. Thus, under this condition, the passage 24 serve as a drain passage.

The oil discharge pressure is relatively low during operation with the 3rd or 4th speed, while it is relatively high during operation with the 1st or 2nd or 3rd or reverse speed. It is known that the before mentioned oil leakage takes place when the oil discharge pressure is relatively high. Thus, the high clutch pressure passage 24 formed through the pump cover is utilized as a drain passage for removing the residual pressure occurring between the pump housing 12.

As best seen in FIG. 1, the pump cover 16 is formed with a groove 60 extending along and radially outward of the pump discharge port 21a and disposed inside the annular rib 16a. Via an opening 62 formed at the bottom of the groove 60, the groove 60 communicates with the high clutch pressure passage 24. In order to bleed air from the high clutch pressure passage 24 and also to facilitate drainage of oil through the passage 24, there is provided an air bleeder 64 as communicating with the groove 60 at an upper end portion thereof as viewed in FIG. 1.

In operation of the oil pump 1, the pump discharge pressure increases to a relatively high level during operation with 1st or reverse speed, inducting oil leakage out of the discharge port into the interface between the pump housing 12 and the pump cover 16, causing a residual pressure to occur between the pump housing 12 and the pump cover 16. This residual pressure is eliminated by removing oil having entered the interface between the pump housing 12 and the pump cover 16 via the groove 60, opening 62 and the passage 24 because the high clutch pressure passage 24 is drained during operation with the 1st or 2nd or reverse speed.

As will now be appreciated from the preceding description, it is an advantage of the present invention that the residual pressure is eliminated without providing an additional drain circuit. Thus, a compact, in radial diameter, and light weight oil pump is provided according to the present invention.

What is claimed is:

1. An oil pump for an automatic transmission, comprising:
   a pump casing including a pump housing formed with a recess receiving therein pump elements, and a pump cover secured to said pump housing, said pump cover and said pump housing defining an interface area therebetween;
   said pump casing being provided with means for defining a predetermined passage which normally serves as an oil pressure delivering passage, said predetermined passage serving as a drain passage under a condition when the oil pump discharge pressure increases, said predetermined passage being open within said interface area.

2. An oil pump as claimed in claim 1, wherein said pump cover is formed with a pump discharge port and said passage defining means include a groove opening at said interface area and extending around said pump discharge port.

3. In an automatic transmission:
   an oil pump comprising a pump casing, said pump casing including a pump housing formed with a recess receiving therein pump elements, and a pump cover secured to said pump housing, said pump cover and said pump housing defining an interface area therebetween;
   said pump casing being provided with means for defining a predetermined passage which normally serves as an oil pressure delivering passage, said predetermined passage serving as a drain passage under a condition when the oil pump discharge pressure increases, said predetermined passage being open within said interface area.

4. An automatic transmission as claimed in claim 1, wherein said pump cover is formed with a pump discharge port and said passage defining means include a groove opening at said interface area and extending around said pump discharge port.

* * * * *